H. A. GOLLOBIN & N. A. BORNSTEIN.
ARTIFICIAL TOOTH.
APPLICATION FILED JAN. 21, 1910.
989,247.  Patented Apr. 11, 1911.
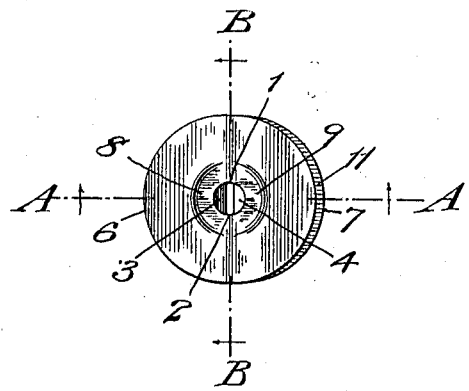
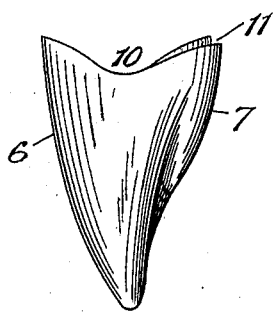
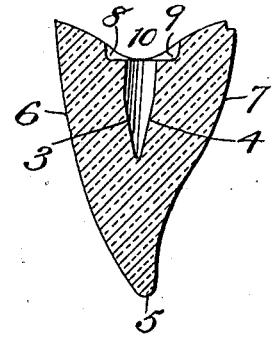
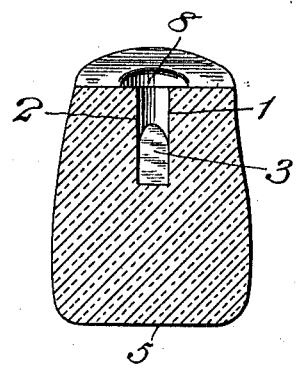

UNITED STATES PATENT OFFICE.

HARRY A. GOLLOBIN AND NEWTON A. BORNSTEIN, OF NEWARK, NEW JERSEY, ASSIGNORS TO THE DENTAL DENTURE IMPROVEMENT COMPANY, OF NEWARK, NEW JERSEY, A CORPORATION OF NEW JERSEY.

ARTIFICIAL TOOTH.

989,247.     Specification of Letters Patent.     Patented Apr. 11, 1911.

Application filed January 21, 1910. Serial No. 539,399.

*To all whom it may concern:*

Be it known that we, HARRY A. GOLLOBIN, a subject of the Russian Empire, and NEWTON A. BORNSTEIN, a citizen of the United States, and residents of Newark, in the county of Essex and State of New Jersey, have invented a new and useful Improvement in Artificial Teeth, of which the following is a specification.

Our invention relates to improvements in artificial teeth and more particularly to the shape of the tooth crown and to the shape of the pin receiving hole whereby a better fit may be obtained between the tooth crown and the part to which it is to be applied, and in which the strength of the tooth crown is materially increased both by its shape and by the shape of the pin receiving hole.

A practical embodiment of our invention is represented in the accompanying drawings, in which—

Figure 1 is a plan view of a tooth crown embodying our invention, Fig. 2 is a side view of the same, Fig. 3 is a section taken in the plane of the line A—A of Fig. 1, looking in the direction of the arrows, and Fig. 4 is a section taken in the plane of the line B—B of Fig. 1, looking in the direction of the arrows.

The pin receiving hole of the tooth crown is provided with parallel side walls 1, 2, and with converging front and back walls 3, 4, so as to permit the bottom of the pin receiving hole to be extended down toward the incisal edge 5 of the tooth crown without weakening the labial and lingual walls 6, 7, of the tooth crown, as is the case where the hole is made of the same diameter throughout or where its bottom is enlarged, as is common. A hole of this shape, furthermore, when used in connection with a correspondingly shaped pin prevents the pin from turning with respect to the tooth crown and thus loosening the cement which secures the pin to the crown.

A seat 8, 9, is provided at the mouth of the pin receiving hole in the base of the tooth crown and the base of the tooth crown is made concave as shown at 10, the bottom of the cavity reaching to the mouth of the pin receiving hole thus dividing the seat 8, 9, at the mouth of the said hole and furnishing an uninterrupted wall between the mouth of the hole and the side walls of the tooth crown.

The lingual wall of the tooth crown at the base thereof is provided with a curved seat 11 for receiving an offset portion on the backing for the crown, not shown herein.

Parts shown and described but not specifically claimed herein, form subject-matter of our co-pending applications filed of even date herewith, Serial Nos. 539,397 and 539,398.

What we claim is:—

1. An artificial tooth crown having a pin receiving hole extending from its base toward its incisal edge, the side walls of the hole being parallel and the front and back walls of the hole toward its inner end being convergent, a seat being provided at the mouth of the hole and the base of the crown being concave, the bottom of the concavity extending to the mouth of the hole thereby dividing the seat.

2. An artificial tooth crown having a pin receiving hole extending from its base toward its incisal edge, the side walls of the hole being parallel and the front and back walls of the hole toward its inner end being convergent, a seat being provided at the mouth of the hole and the base of the crown being concave, the bottom of the concavity extending to the mouth of the hole thereby dividing the seat, the lingual wall of the crown at the base thereof being provided with a curved seat upon the extreme outer edge for receiving an offset portion on the base of the backing for the crown.

In testimony, that we claim the foregoing as our invention, we have signed our names in presence of two witnesses, this 14th day of January, 1910.

HARRY A. GOLLOBIN.
        NEWTON A. BORNSTEIN.

Witnesses:
   F. GEORGE BARRY,
   C. S. SUNDGREN.